United States Patent Office 3,237,698
Patented Mar. 1, 1966

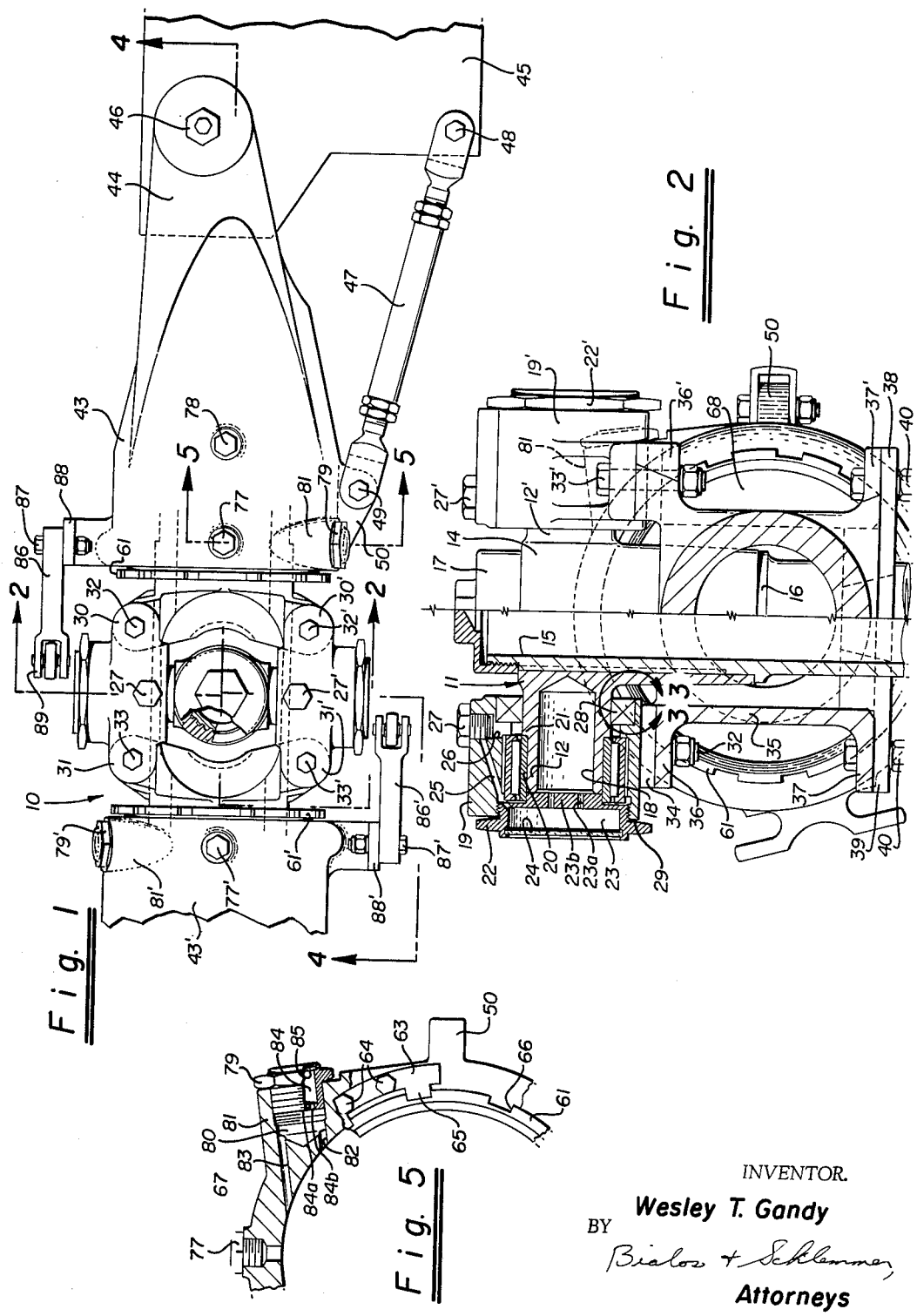

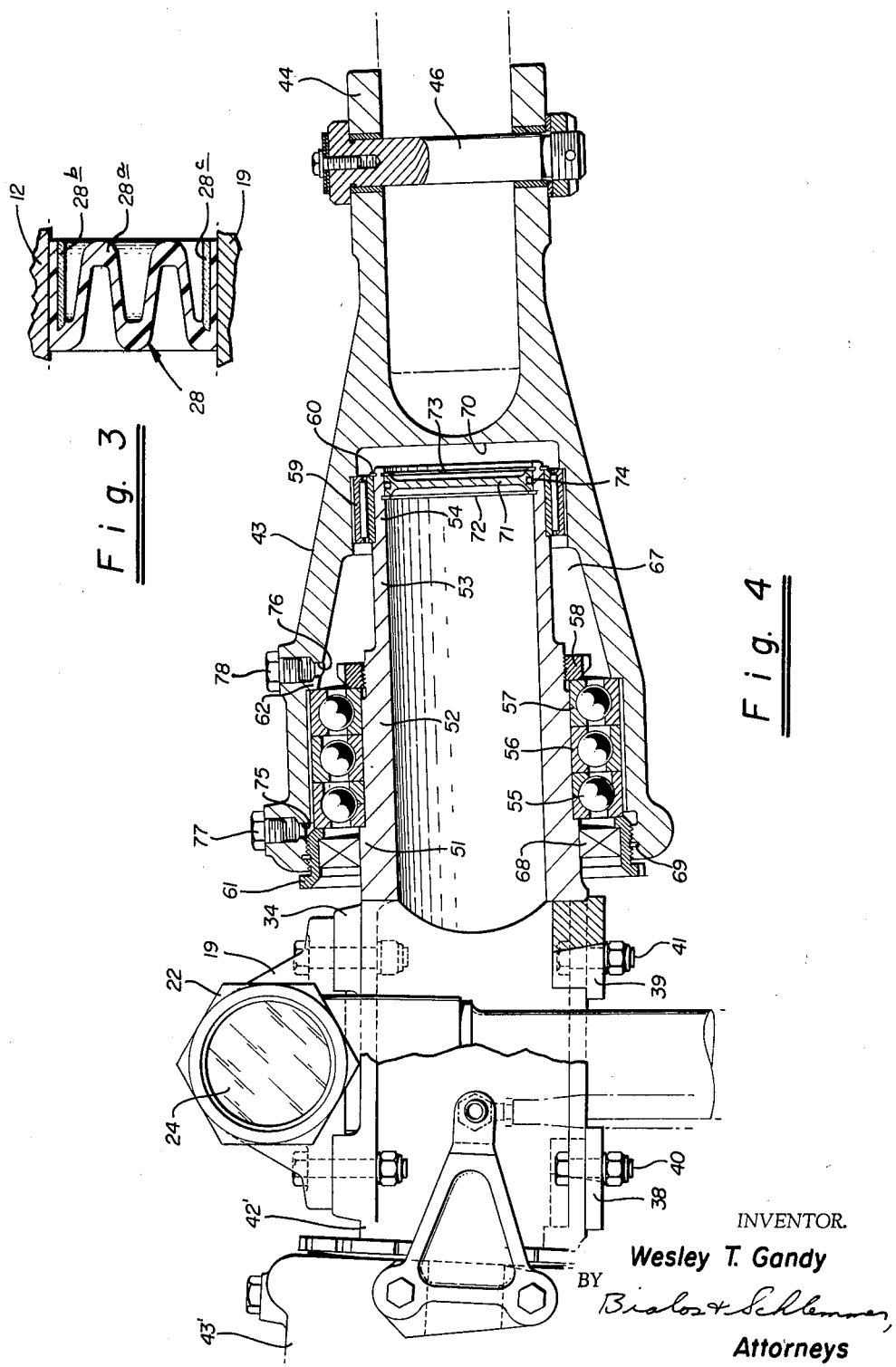

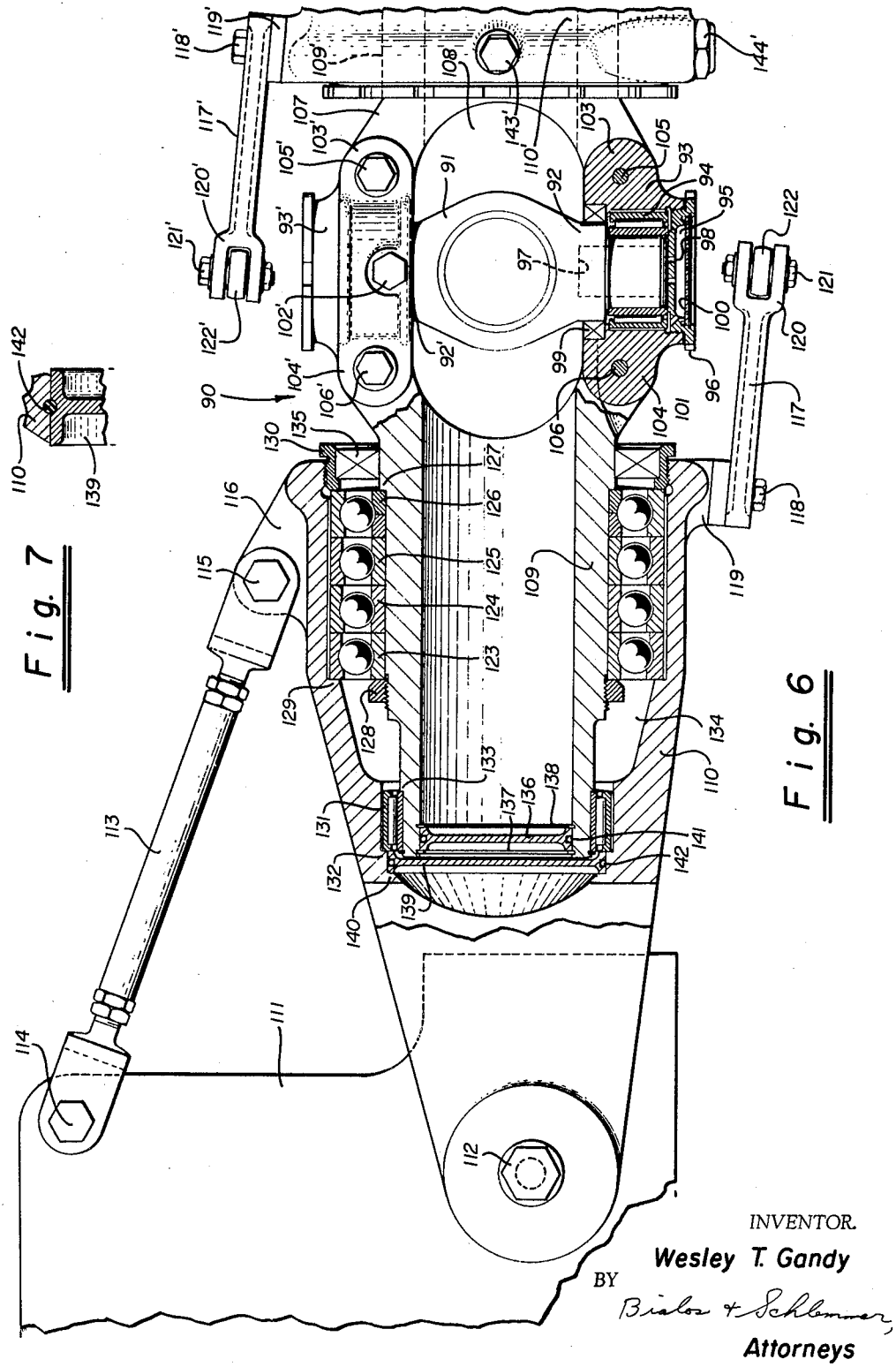

3,237,698
LUBRICATED HUB AND BEARING ASSEMBLY FOR A ROTARY WING AIRCRAFT
Wesley T. Gandy, Palo Alto, Calif., assignor, by mesne assignments, to Fairchild Hiller Corporation, Hagerstown, Md., a corporation of Maryland
Filed Aug. 6, 1963, Ser. No. 300,254
6 Claims. (Cl. 170—160.23)

This invention relates to a rotary wing aircraft, and more particularly to a lubricated hub and bearing assembly therefor.

In contemporary rotary wing aircraft, the rotary wing or lift-blade assembly thereof necessarily effects a plurality of complex motions and is subjected to significant static and relatively large dynamic loads. More specifically, each rotor blade is usually rotatable about its longitudinal or span-wise axis to permit the collective pitch thereof to be selectively adjusted and also to permit the blade to be continuously feathered as it traverses a complete rotary arc of 360° to provide cyclic pitch control. Further, a teetering rotor assembly is supported for pivotal movement about one or more axes generally normal to the longitudinal axis of the rotor column or drive shaft thereof to permit the tip-path plane of the rotor blades to be tilted or flapped about such axis or axes to balance the dissymmetry of lift which is a characteristic of single-rotor aircraft.

Quite evidently, the rotor blades, or at least certain components thereof, must be appropriately supported upon bearings to enable such complex movements to be accomplished against the inertial and dynamic forces tending to resist the same; and because of the magnitude of such forces, the continuous nature of the rotor and blade motions and the characteristics of the aircraft, the rotor assembly (and in particular the bearing components thereof) is subject to deterioration that is seriously accelerated by any oxidation of such components, which is a common phenomenon in the rotor hub assembly of rotary wing aircraft.

Accordingly, an object of the present invention is to provide an improved rotor hub assembly that readily accommodates the aforementioned motions and movements and protects those components most subject to deterioration from the accelerative action of the atmosphere.

Another object of the invention is that of providing an improved rotor hub assembly in which the rotor blades thereof are supported on bearings to facilitate rotational or angular movement about their span-wise axes to permit collective and cyclic pitch changes to be effected, and in which the hub assembly is supported on bearings for flapping or teetering movements about an axis generally normal to the longitudinal axis of the rotor column; all such bearings being continuously covered by or bathed in a lubricant to protect the same from the oxidizing effects of the atmosphere.

Still another object is in the provision of a rotor hub assembly of the character described in which the rotor blades are each supported by a plurality of bearing compositions, one such composition being a thrust bearing accommodating centrifugal loadings of the blade which are quite commonly in the order of 30,000 to 40,000 pounds, and the other such composition being a rotatable support for the blade affording angular movements thereof about its spanwise axis; all such bearing compositions being continuously bathed in a lubricant.

A further object of the invention is to provide a rotor hub assembly of the character described in which the various bearing compositions respectively associated with the rotor blades and spindle supports therefor and with the teetering-axis journals are respectively located within lubricant chambers adapted to be continuously and completely filled with a lubricant—each such chamber being equipped with gauge means for conveniently determining the quantity of lubricant therewithin.

Yet a further object of the invention is that of providing a rotor hub assembly having a plurality of lubricant chambers of the type described, and in which such chambers are defined in part by seal or closure components—one of which in each instance accommodates relative movement between the parts sealingly related thereby and is located and disposed so that the centrifugal forces operative upon the lubricant during rotational movement of the rotor hub assembly act in a direction opposite to such seals and tend to reduce the fluid pressure thereon so that the tendency for leakage to develop at these seals is minimized and substantially avoided.

Additional objects and advantages of the invention will become apparent as the specification develops.

Embodiments of the invention are illustrated in the accompanying drawings, in which:

FIGURE 1 is a broken top plan view, partly in section, of a rotor hub assembly embodying the invention;

FIGURE 2 is an enlarged transverse sectional view taken along the line 2—2 of FIGURE 1;

FIGURE 3 is an enlarged cross sectional view of one of the seal elements;

FIGURE 4 is an enlarged broken longitudinal sectional view taken along the line 4—4 of FIGURE 1;

FIGURE 5 is a fragmentary sectional view, with parts broken away, taken generally along the line 5—5 of FIGURE 1;

FIGURE 6 is a broken longitudinal sectional view of a modified rotor hub assembly; and FIGURE 7 is an enlarged fragmentary view of a chamber closure-structure in the assembly of FIGURE 6.

The rotor hub assembly shown in FIGURES 1 through 5 is designated in its entirety with the numeral 10, and includes a spindle 11 having a pair of journals 12 and 12' which are diametrically oriented and extend outwardly in opposite directions from a central sleeve 14 of the spindle. The sleeve 14 is mounted upon the upper end portion of a rotor column or drive shaft 15, and is splined thereto so as to be rotatably driven thereby. The spindle 11 is constrained upon the shaft 15 against axial displacements therealong by an outwardly extending annular shoulder 16 provided by the shaft a spaced distance from the upper end thereof, which is engaged by the sleeve at its lower end, and by a nut or cap 17 that threadedly engages the shaft at its upper end and bears downwardly upon the spindle 11. The rotor column or shaft 15 is rotatably driven by an engine or prime mover through appropriate drive mechanism (neither being shown), as is well known in the art, both of which may be regarded as conventional for purposes of the present invention.

As shown most clearly in FIGURE 2, the journal 12 has a centrally disposed bore or passage 18 therein, and circumjacent the journal 12 is a collar 19 supported for rotational movement relative thereto upon a bearing assembly 20. In the particular form shown, the bearing assembly 20 comprises a roller bearing composition having an inner race mounted upon the journal 12 and an outer race supporting the collar 19. The inner race of the bearing assembly seats against an annular shoulder 21 provided by the journal, and is held in engagement therewith by a sight-gauge nut 22 that extends into the collar 19 and threadedly engages the outer end portion thereof. The sight-gauge 22 has a hollow interior 23 that communicates with the journal bore 18 through a plurality of apertures 23a formed in the inner wall 23b of the gauge. The sight-gauge also provides a transparent outer wall or window 24 that is centrally disposed and defines an outer end closure for a chamber formed in part by the journal bore 18 and hollow interior 23 of the gauge, and in part by the annular space defined between the journal 12 and circumjacent collar 19.

Such compartment is adapted to contain a suitable lubricant, and is filled through an angularly disposed passage 25 in the collar 19 which, at its upper inner end, communicates with a filler opening 26 normally closed by a threaded plug 27 and, at its lower outer end, communicates with the chamber adjacent the bearing assembly 20. The annular space that contains the bearing assembly 20 connects with the hollow interior 23 of the sight-gauge through a plurality of openings or apertures along the threaded periphery thereof, as shown in FIGURE 2. An annular seal 28, positioned between the journal 12 and circumjacent collar 19 at the inner ends thereof forms a substantially liquid-tight seal between these two components while permitting angular displacements of the collar 19 relative to the journal 12. The seal 28 may be an oscillating-type seal, as shown in FIGURE 3, in which a flexible convoluted diaphragm 28a is frictionally secured along opposite edges thereof to the journal and collar by concentric clamp rings 28b and 28c. A seal 29 is positioned between the facing surface of the sight-gauge nut 22 and collar 19 to prevent the escape of lubricant therebetween, and a further seal (not shown) is desirably placed under the head of the plug 27.

The journal 12' is enclosed by precisely the equivalent structural composition that surrounds and encloses the journal 12, and, therefore, such description need not be repeated. For purposes of identification, the collar supported upon the journal 12' is denoted with the numeral 19', and the sight-gauge nut in association therewith is designated by the numeral 22'. The two collar assemblies 19 and 19' are rigidly related with respect to each other through structure that will be described hereinafter, and for this reason displacements of the two collars along the common axis defined by the journals 12 and 12' are prevented—the collar 19 and its bearing assembly 20 being constrained against inward movement along the journal 12 by engagement of the bearing assembly with the shoulder 21 of the journal and engagement of the nut 22 with the journal, and, as a consequence, the collar 19' is prevented from moving outwardly relative to the journal 12'. Conversely, the collar 19' is constrained against inward movement along the journal 12' therefor, and as a result, the collar 19 is constrained against outward displacements with respect to its journal 12. The common axis defined by the journals 12 and 12' is substantially normal to the spin axis or longitudinal axis of the shaft 15 and constitutes the flapping axis of the rotor assembly which is of the teetering type.

The collar 19 is equipped with a pair of oppositely oriented, longitudinally extending ears 30 and 31 centrally apertured to respectively pass bolts 32 and 33 therethrough. The bolts 32 and 33 extend through openings provided therefor in respectively aligned bosses 34 of a generally tubular hanger 35 coaxially circumjacent the shaft 15 and located therealong below the collars 19 and 19'. The bosses 34 are formed integrally with an outwardly extending upper flange 36 provided by the hanger 35 on one side thereof, and the hanger is also provided on such side with an outwardly extending lower flange 37.

As shown most clearly in FIGURES 2 and 4, the bolts 32 and 33 extend through the bosses 34 and also through the upper flange 36, and rigidly anchor the hanger to the collar 19. Along its opposite side, the hanger 35 is similarly provided with upper and lower flanges 36' and 37', and the collar 19' is rigidly related to the hanger and upper flange 36' thereof by bolts 32' and 33' which extend through the respective ears 30' and 31' of the collar. Consequently, the hanger 35 effectively depends from the spindle 11, and more particularly the journals 12 and 12' thereof, and is angularly or rotatably displaceable with respect thereto and with respect to the rotor column or shaft 15 and, as is evident in FIGURE 2, the central opening through the tubular hanger has an inner diameter that is substantially greater than the outer diameter of the shaft to accommodate such pivotal movement. As shown most clearly in FIGURES 2 and 4, a pair of longitudinally spaced stops 38 and 39 are respectively secured to the flanges 37 and 37' by bolts 40 and 41 and define the limits of pivotal movement of the hanger 35 relative to the shaft 15; and for example, such movement may be in the order of 10° in either direction with respect to the axis of the shaft 15.

Formed integrally with the hanger 35 or otherwise rigidly related thereto are a pair of oppositely extending, diametrically oriented tubular sleeves or spindle shafts 42 and 42' having respectively mounted thereon sockets or blade holders 43 and 43'. Since the spindle shafts 42 and 42' are substantially identical, as are the blade holders 43 and 43', the details of the assembly 42–43 only are shown; and in the following discussion such assembly will be considered in particular. However, it should be understood that such discussion applies equally to the assembly 42'–43'.

The blade holder 43 has a bifurcated outer end 44 adapted to receive a rotor blade or lift wing 45 therein, which is held in position relative to such bifurcated end by a relatively large pin or bolt 46 that extends through the blade and through openings provided therefor in such bifurcated end portion 44. The blade 45 is supported for pivotal movement and the pin 46 is related to the bifurcated end 44 by bearing structure to accommodate such movement of the blade, as shown in FIGURE 4. The blade 45 is anchored or held in the extended position shown by a drag link 47 secured at one end by a bolt 48 to the blade 45, and secured at its other end by a bolt 49 to a boss 50 extending outwardly from the blade holder 43. The length of the drag link 47 can be selectively determined, as is well known and as indicated in FIGURE 1 to permit proper alignment of the rotor blade.

The spindle shaft 42 has a plurality of successive steps 51, 52, 53 and 54 therealong the define shoulders at the respective locations of mergence thereof. Mounted upon the step 52 is a thrust bearing structure comprised of three ball bearing compositions 55, 56 and 57. The inner race of the bearing composition 55 is in abutment with the shoulder defined by the mergence of the steps 51 and 52, and is urged into such abutment through the intermediate bearings 56 and 57 by a nut 58 that is threadedly received upon the outer threaded end portion of the step 52. Thus, the bearings are located upon the step 52 and are constrained against axial displacements therealong in one direction by the shoulder and in the opposite direction by the nut 58. The inner race of the bearing composition 55 is split (as indicated in the drawing) to accommodate the adjusting thrust or force of the nut 58. Mounted upon the step adjacent the outer end thereof is a needle or roller bearing assembly 59, the inner race of which at the inner end thereof abuts the shoulder formed by the mergence of the steps 53 and 54. Such inner race is held in engagement with the shoulder by a retaining ring 60.

The blade holder 43 is supported upon all of the bearing assemblies and (as shown in FIGURE 4) coaxially receives the spindle shaft 42 therein. The blade holder is locked in position upon the spindle shaft by a hollow nut 61 that is located circumjacent the shaft and threadedly engages the tapped inner end of the blade holder 43. As the nut 61 is tightened, it bears against the outer race of the bearing composition 55 and draws the blade holder 43 onto the shaft until an internal shoulder 62 provided by the blade holder abuts the outer race of the bearing composition 57. As shown in FIGURE 5, the nut 61 is then maintained in the tightened position thereof by a lock 63 secured to the blade holder by a plurality of cap screws 64, and which is provided with one or more dogs 65. A plurality of recesses 66 are provided by the nut 61 about the peripheral outer surface thereof, and each such dog 65 is adapted to seat within a recess aligned therewith.

As is evident in FIGURE 4, a relatively large chamber or compartment 67 is defined between the spindle shaft 42 and that portion of the blade holder 43 which is circumjacent thereto, and the thrust bearing assembly 55–56–57 and roller bearing assembly 59 are located within such compartment. The inner end of the compartment is closed by a seal member 68 that is positioned within the hollow nut 61, and extends between the inner annular surface thereof and the adjacent annular outer surface of the spindle shaft 42. The seal 68 may be an oscillating-type seal as shown in FIGURE 3. A nylon ring or seal 69 may be provided, as shown, along the threaded mating surfaces of the nut 61 and blade holder 43 to prevent the escape of lubricant therebetween.

The compartment 67 is closed at the inner end thereof by closure structure comprising a solid wall 70 provided by the blade holder and by a rigid seal 71 mounted within the hollow spindle shaft 42 adjacent the outer end thereof. The seal 71 may be a metal diaphragm held in position by retaining rings 72 and 73, and the outer annular surface of the diaphragm seal 71 may be recessed to accommodate an O-ring 74 that defines a liquid-tight seal between the contiguous surfaces of the seal and spindle shaft 42. The compartment 67 is adapted to be filled with a lubricant, and a pair of filler openings 75 and 76 for such purpose are provided through the wall of the blade retainer 43. The filler openings comunicate with such compartment and are normally closed by threaded plugs 77 and 78 respectively received therein.

The quantity of lubricant contained within the chamber 67 is determined by a sight gauge 79 in the form of a plug that is threadedly received within a tapped bore 80 provided in a boss or enlargement 81 of the blade holder 43. The bore 80 communicates with the chamber 67 through a plurality of passages 82 and 83, and such passages are vertically separated as shown in FIGURE 5. The sight gauge 79 has a hollow interior 84 that is closed at its outer end by a transparent viewing window 85, and the inner end closure 84a of the hollow interior 84 is provided with a plurality of apertures 84b that connect the interior 84 with the bore 80. Lubricant supplied to the chamber 67 flows into the bore 80 through the passage 82, and into the hollow interior 84 of the sight gauge through the apertures 84b. The passage 83, which is disposed above the passage 82, permits the escape of air from the bore 80 and hollow interior of the sight gauge to permit the same to be filled with lubricant.

The blade holder 43 is related to the spindle shaft 42 for angular motion about the axis thereof to permit adjustable determination of the collective pitch of the blade 45 and also to permit cyclic pitch or feathering of the blade as the hub assembly is rotated. The requisite angular displacements of the blade holder 43 are enforced thereon through an incidence arm 86 rigidly connected by a plurality of bolts 87 to a bracket 88 bolted or otherwise rigidly secured to the blade holder 43 (see FIGURE 4). The incidence arm 86 has a bifurcated end portion 89 adapted to be pivotally connected to a rod or link (not shown), the position of which (and therefore the position of the blade holder 43 and blade 45) being determined through any suitable control assembly as, for example, the customary wobble plate composition such as shown in Patent No. 2,534,353.

As explained hereinbefore, the particular rotor assembly shown and described is a teetering-type rotor supported for pivotal or angular displacements relative to the drive shaft 15 about a teetering axis that is generally normal to the spin axis or longitudinal axis of such shaft. The arrangement permits the tip-path plane of the diametrically oriented and oppositely extending rotor blades to be flapped or tilted, about such teetering axis, in accordance with the cyclic pitch adjustment of the rotor assembly. The rotor blades and spindle shafts 42 and 42' define the aforementioned longitudinal or span-wise axis which is also generally normal to the spin axis and is angularly offset from the teetering axis by substantially 90°. The rotor blades are each pivotal or angularly displaceable about such span-wise axis to permit both cyclic and collective pitch adjustment of the rotor assembly.

In operation of the rotor hub assembly, the shaft 15 is rotatably driven by the engine of the helicopter and, as a consequence, the spindle 11 is rotated about the longitudinal axis of the shaft 15 because it is splined thereto. Thus, the pivot or teetering axis defined by the journals 12 and 12' describe an arcuate path about the axis of the shaft 15. Consequently, the collars 19 and 19', which are respectively supported upon the journals 12 and 12' for angular or pivotal movement with respect thereto, describe rotary paths relative to the axis of the shaft 15. Such angular movement of the collars 19 and 19' is facilitated by the bearing supports therefor on the respectively associated journals, and each such bearing support is continuously bathed in a lubricant because the composite or total chamber defined, in the case of the collar 19 and spindle 11, by the bore 18 in the journal, the open space 23 in the sight gauge 22, and the annular space provided between the journal 12 and circumjacent collar 19 is completely filled with such lubricant and the bearing 20 is mounted within such composite chamber and, in particular, is located within the space defined between the journal and surrounding collar.

This compartment is closed at the inner end thereof adjacent the shaft 15, by the seal element 28 which is positioned between the journal 12 and collar 19 and sealingly-engages each. The seal element 28 affords or permits relative angular movements between the journal and collar and, as a result, is leakage prone or subject to wear and deterioration in contradistinction to a rigid closure at which no relative movement occurs along the sealing surfaces thereof. The opposite or outer end portion of the composite chamber is closed by the sight window 24, which is rigidly carried by the sight-gauge nut 22, and by the outwardly extending flange or head of the gauge, the gasket or seal 29 and the adjacent outer surface of the collar 19. The closure structure provided by such elements at the outer end of the chamber is not readily susceptible to leakage because the surfaces at which leakage might occur are fixedly related to the respectively associated components and ordinarily no relative movement occurs therebetween.

As the collars 19 and 19' rotate about the axis of the shaft 15, the centrifugal forces operative upon the lubricant within the chamber tend to force the lubricant outwardly, thereby relieving the fluid pressure on the leakage-susceptible seal 28 and concentrating such pressure on the leakage-resistant closure at the outer end of the chamber.

The sight gauge 22 provides a convenient indicia of the quantity of lubricant within the chamber or compartment because the extent to which it is filled with a lubricant can be determined readily by visual inspection. Therefore, the chamber can be maintained in a completely filled state and, as a result, the bearing 20 is continuously and completely covered by the lubricant, as are the other surfaces within the chamber. Consequently, the deleterious effects of oxidation on such surfaces and on the bearing are effectively obviated, thereby reducing maintenance requirements and materially improving and maintaining the aircraft in a safe operating condition.

Similarly, and with reference to the spindle shaft 42 and blade holder 43, rotation of the shaft 15 and of the spindle 11 causes the axes defined by the spindle shafts 42 and 42' to describe rotary or arcuate paths about the shaft 15 and its longitudinal axis because such spindle shafts are carried by the hanger 35 which is rigidly secured to and depends from the collars 19 and 19'. The chamber 67 defined by the spindle shaft 42 and blade holder 43 is closed at the inner end thereof adjacent the shaft 15 by the seal element 68 extending between the spindle shaft and blade holder, or more particularly between the spindle shaft and the nut 61 which, at this time, is fixedly secured to the blade holder 43 and may be regarded as a part of the blade holder as respects the sealing function of the seal element 28. Such sealing element is leakage-susceptible for the reasons set forth with respect to the seal element 28.

The outer end of the compartment 67 is closed by closure structure which includes the lubricant-impervious surface 70 of the blade holder 43 and the seal or diaphragm 71 which is rigidly related to the spindle shaft 42 by the retaining rings 72 and 73 and O-ring 74. Thus, no relative movement occurs between the sealing surfaces of the closure structure and either the spindle shaft 42 or blade holder 43. In particular, the surface 70 is formed integrally with the blade holder 43 so that no relative movement can occur therebetween, and the diaphragm 70 is rigidly related to the spindle shaft 42 and ordinarily no relative movement between these two components occurs.

The chamber 67 is filled with lubricant through one or both of the plug equipped openings 75 and 76, and the quantity of lubricant within the chamber is readily determined by visual inspection through the transparent window 85 of the sight gauge 79. Thus, the chamber can be maintained in a filled condition so that the thrust bearing assembly comprised of the bearing compositions 55, 56 and 57 and the roller bearing assembly 59 are completely covered by such lubricant and are thereby protected from oxidation, as described hereinbefore with reference to the bearing assembly 20. Additionally, as previously explained, centrifugal force operative upon the lubricant contained within the chamber 67 tends to displace the lubricant outwardly upon rotation of the hub assembly, whereupon dynamic fluid forces do not act against the seal element 68 and the static fluid forces tend to be relieved from the leakage-susceptible or weaker seal 68 and concentrated against the outer leakage-resistant or stronger closure structure of the chamber 67, and in particular the closure surface 70 thereof.

It will be appreciated that the described operational characteristics of the journal 12, collar 19 and associated structure applies equally to the journal 12', bearing 19' and structure associated therewith because, with respect to these two structural compositions, the hub assembly is symmetrical about the longitudinal axis of the shaft 15. Further, the described operational characteristics of the spindle shaft 42, blade holder 43 and associated structure apply equally to the spindle shaft 42', blade holder 43' and structure associated therewith, because with respect to these two structural compositions, the hub assembly is also symmetrical about the longitudinal axis of the shaft 15.

A slightly modified rotor hub assembly is illustrated in FIGURE 6 and, with respect to the present invention, constitutes a variation of the prior described assembly only in that the closure structure adjacent the outer end portion of the blade holder is of somewhat different mechanical composition. Thus, the rotor assembly 90 has a spindle 91 splined or otherwise affixed to a drive shaft (not shown) so as to be rotatably driven thereby. The spindle 91 has a pair of diametrically oriented, oppositely extending journals 92 and 92' that respectively support collars 93 and 93' thereon.

The collar 93 is related to the journal 92 by a roller bearing assembly 94, and the bearing assembly is located within a chamber defined in part by the annular space between the journal and circumjacent bearing and in part by the opening 95 in a sight-gauge closure plug 96 and by a bore 97 in the journal which communicates with the space 95 through a plurality of apertures 98 in the inner wall of the sight-gauge. Such chamber is sealed at the inner end thereof by a seal element 99 (which may be of the type shown in FIGURE 3), and at the outer end by closure structure which includes the sight-gauge 96, transparent window 100 thereof and a gasket or seal 101 which is interposed between the outwardly extending flange of the sight-gauge and adjacent outer surface of the collar 93. The lubrication chamber is filled through a plug-equipped opening—the plug for the collar 93' being illustrated and designated with the numeral 102'.

The construction and function of the journal and collar assemblies 92–93 and 92'–93' are identical, and are also substantially the same as the journal and collar compositions 12–19 and 12'–19' heretofore described. Therefore, a description of such characteristics is unnecessary and will not be repeated.

The collar 93 is equipped with outwardly extending ears 103 and 104 connected by bolts 105 and 106 to a depending hanger 107. Similarly, the collar 93' is equipped with ears 103' and 104', respectively connected by bolts 105' and 106' to the hanger 107 whereupon such hanger is rigidly related to each of the collars.

The hanger 107 is provided centrally with a large opening 109 therethrough that permits the hub assembly to pivot or flap about the common teetering axis defined by the journals 92 and 92' relative to the rotor column or drive shaft and, as indicated hereinbefore, the extent of such angular displacement may be in the order of 10° in each direction from the axis of such shaft. Formed integrally with the hanger 107 and extending outwardly therefrom in diametrically opposed orientation are tubular journals or spindle shafts 109 and 109' which are respectively equipped with circumjacent blade holders 110 and 110'. The blade holders are equipped with rotor blades or lift wings and, as shown in FIGURE 6, the outer end of the blade holder 110 is bifurcated and receives a blade 111 therein which is secured thereto by a pivot pin or bolt 112. The position of the blade 111 is fixedly determined by a drag link 113 secured at one end to the blade by a bolt 114 and secured at its other end by a bolt 115 to an outwardly extending boss or enlargement 116 provided by the blade holder 110.

The blade holder is angularly displaced or pivoted about the spindle shaft 109 by an incidence arm 117 rigidly secured by a plurality of bolts 118 to a bracket 119 that is rigidly related to the blade holder 110. One end of the incidence arm is bifurcated, as shown at 120, and is pivotally secured thereat by a bolt 121 to a rod or link 122 that is displaceable generally along the longitudinal axis thereof to effect angular displacement of the blade holder 110, and thereby determine the cyclic and collective pitch of the lift wing or rotor blade 111.

The blade holder 110 is secured to the spindle shaft 109 by a thrust bearing assembly that constrains the blade holder against axial displacements relative to the shaft. The thrust bearing assembly comprises a plurality of roller bearing compositions 123, 124, 125 and 126, the inner race of the latter being seated against a shoulder 127 formed along the spindle shaft. A nut 128 which is threadedly received upon the spindle shaft and bears against the inner race of the bearing 123 so forces the bearing 126 against the shoulder 127 through the intermediate agency of the bearings 123, 124 and 125. The outer race of the bearing 123 engages a shoulder 129 provided by the blade holder 110 which is drawn into such position by a large hollow nut 130 that threadedly engages the inner end of the blade holder 110 and bears against the outer race of the bearing composition 126.

The blade holder 110 is supported for rotational or angular movement upon a roller bearing assembly 131, the outer race of which bears against a shoulder 132 provided by the blade holder and the inner race of which bears against a shoulder 133 provided by the spindle shaft. Both the thrust and roller bearing assemblies are located within a chamber 134 defined between the spindle shaft and circumjacent blade holder.

The inner end of the chamber 134 is closed by a seal element 135 (that may be the same type of seal shown in FIGURE 3) which extends between the spindle shaft and the inner surface of the nut 130 which, with respect to the sealing function performed by the element 135, may be taken to be the same as the blade holder 110 and, therefore the seal element effectively extends between the spindle shaft and blade holder. The outer end of the compartment 134 is closed by closure structure (see also FIGURE 7) comprised of a rigid seal or metal diaphragm 136 rigidly secured to the spindle shaft 109 by a pair of retainer rings 137 and 138, and of a rigid seal or metal diaphragm 139 rigidly anchored to the blade holder 110 and constrained between a shoulder 140 provided thereby and the outer race of the bearing assembly 131. As shown in FIGURE 5, the diaphragms 136 and 139 may have an annular recess along the cylindrical outer surface thereof, and respectively mounted therein are O-ring seals 141 and 142.

The chamber 134 may be filled with lubricant through a plug-equipped filler opening, the plug associated with the blade holder 110' being illustrated and designated with the numeral 143'. The quantity of lubricant within the chamber is readily ascertained by visual inspection through a side-gauge, such a gauge being shown in association with the blade holder 110' and designated with the numeral 144'. The construction and operation of each sight-gauge is substantially the same as the sight-gage 79 shown in FIGURE 4, and, therefore, this element will not be further described in detail.

The mechanical interrelation of the spindle shaft 109' and blade holder 110' is the same as that of the spindle shaft 109 and blade holder 110, and, therefore, the foregoing description applies equally to both structural compositions. As the rotor assembly is driven by the rotor column or drive shaft, the lubricant within the chamber 134 will tend to be displaced outwardly by the centrifugal forces active thereon, in which event the fluid pressure active against the leakage susceptible or weaker seal element 135 will be relieved and concentrated against the leakage-resistant or stronger closure structure at the outer end of the chamber 135. Such closure structure is comprised of the diaphragms 136 and 139 which are rigidly related to the respectively associated spindle shaft and blade holder, and, therefore, no relative movement occurs between the diaphragms and their associated components. Thus, the function and operation of the hub assembly shown in FIGURE 6 is essentially the same as the rotor assembly illustrated in FIGURES 1 through 5 and will not be further elaborated.

The described embodiments exemplify the inventive concept of continuously and completely encapsulating the bearing assemblies and wear surfaces of relatively movable structures which are rotatable about a predetermined or spin axis in a body of lubricant to exclude air from such assemblies and surfaces and thereby prevent oxidation and consequent deterioration and destruction thereof, which would otherwise occur because of the effects of ambient air thereon and which is especially significant in connection with the rotor assembly of a helicopter; and of utilizing the centrifugal forces inherently developed in a rotating assembly to relieve the lubricant pressures adjacent sealed, relatively movable surfaces which are highly susceptible to leakage, and concentrate such forces along rigid closure structure which is not so susceptible to leakage.

While in the foregoing specification and embodiment of the invention has been set forth in considerable detail for purposes of making an adequate disclosure thereof, it will be apparent to those skilled in the art that numerous changes may be made in such details without departing from the spirit and principles of the invention.

I claim:

1. A teetering rotor hub assembly for a rotary wing aircraft, comprising a spindle adapted to be rotated about a spin axis and being equipped with a hollow journal provided with an outer end portion having bearing structure mounted therealong and defining a teetering axis extending generally transversely of such spin axis, a pivot element circumjacent at least a portion of said journal and defining therewith a chamber about said bearing structure for receiving a body of lubricant therein, a seal structure sealingly engaging said journal and pivot elements and accommodating relative angular movements therebetween about such teetering axis and defining an inner end closure for said chamber, closure structure sealingly closing the outer end portion of said chamber and being located and positioned so that substantially no relative angular movement occurs between the chamber-sealing surfaces thereof and contiguous surfaces of either said journal or pivot element, said closure structure including a pair of relatively rigid components one of which is provided by said pivot element adjacent the outer end of said journal and the other being provided by said journal inwardly of said one rigid component, whereby the centrifugal forces developed within such body of lubricant upon rotation of said rotor hub assembly tend to relieve said seal structure of lubricant pressures and direct the same toward said closure structure and against the one rigid component thereof, and a sight gauge providing visual indicia of the quantity of lubricant within said chamber and comprising as an element thereof the aforesaid rigid component provided by said pivot element.

2. A teetering rotor hub assembly for a rotary wing aircraft, comprising a spindle adapted to be rotated about a spin axis and being equipped with a hollow journal provided with an outer end portion having bearing structure mounted therealong and defining a teetering axis extending generally transversely of such spin axis, a pivot element circumjacent at least a portion of said journal and defining therewith a chamber about said bearing structure for receiving a body of lubricant therein, a seal structure sealingly engaging said journal and pivot elements and accommodating relative angular movements therebetween about such teetering axis and defining an inner end closure for said chamber, closure structure sealingly closing the outer end portion of said chamber and being located and positioned so that substantially no relative angular movement occurs between the chamber-sealing surfaces thereof and contiguous surfaces of either said journal or pivot element, said closure structure including a pair of relatively rigid components one of which is provided by said pivot element adjacent the outer end of said journal and the other being provided by said journal inwardly of said one rigid component, said spindle further being equipped with an outwardly extending hollow spindle shaft defining a pitch-control axis and provided with an outer end portion having a bearing structure mounted therealong, a blade holder circumjacent said spindle shaft and being supported by said bearing structure thereon for pitch-determining displacements about the pitch-control axis, said spindle shaft and blade holder defining a chamber about the associated bearing structure for receiving a body of lubricant therein, a seal structure defining an inner end closure for said spindle-shaft chamber and being sealingly connected with said spindle shaft and blade holder and accommodating pitch-determining displacements of the latter, and a closure structure sealingly closing the outer end portion of said spindle shaft chamber and being located and positioned so that substantially no relative angular movement occurs between the chamber-sealing surfaces thereof and any spindle shaft or blade holder surfaces contiguous therewith, said last-mentioned closure structure including a pair of relatively rigid components one of which is provided by said blade holder outwardly of said spindle shaft and the other being provided by said spindle shaft inwardly of the associated one rigid component, whereby the centrifugal forces developed within such bodies of lubricant upon rotation of said rotor hub assembly tend to relieve said seal structures of lubricant pressures and direct the same toward the respectively associated closure structures and against the aforesaid one rigid component of each.

3. A teetering rotor hub assembly for a rotary wing aircraft, comprising a spindle adapted to be rotated about a spin axis and being equipped with a journal provided with an outer end portion having bearing structure mounted therealong and defining a teetering axis extending generally transversely of such spin axis, a pivot element circumjacent at least a portion of said journal and defining therewith a chamber about said bearing structure for receiving a body of lubricant therein, a seal structure sealingly engaging said journal and pivot elements and accommodating relative angular movements therebetween about such teetering axis, closure structure sealingly closing the outer end portion of said chamber, said spindle further being equipped with an outwardly extending spindle shaft defining a pitch-control axis and provided with an outer end portion having a bearing structure mounted therealong, a blade holder circumjacent said spindle shaft and being supported by said bearing structure for pitch-determining displacements about the pitch-control axis, said spindle shaft and blade holder defining a chamber about said bearing structure for receiving a body of lubricant therein, a seal structure defining an inner end closure for said chamber and being sealingly connected with said spindle shaft and blade holder and accommodating pitch-determining displacements of the latter, a closure structure sealingly closing the outer end portion of said spindle shaft chamber, and a pair of sight gauges respectively associated with said chambers for providing visual indicia of the contents thereof, the centrifugal forces developed within such bodies of lubricant upon rotation of said rotor hub assembly tending to relieve said seal structures of lubricant pressures and direct the same toward the respectively associated closure structures.

4. The rotor hub assembly of claim 3 in which each of said closure structures is comprised of a relatively rigid component.

5. The rotor hub assembly of claim 3 in which said journal and said spindle shaft are each hollow, and in which one of said closure structures comprises a component associated with said hollow journal in closing relation therewith and the other of said closure structures comprises a component associated with said hollow spindle shaft is closing relation therewith.

6. The rotor hub assembly of claim 3 in which the sight gauge associated with said journal and pivot element comprises as an element thereof at least a part of the aforesaid closure structure associated therewith.

References Cited by the Examiner
UNITED STATES PATENTS

| | | | |
|---|---|---|---|
| 2,000,293 | 5/1935 | Morrow | 308—187.1 |
| 2,358,310 | 9/1944 | Bebinger | 308—187.1 |
| 2,370,023 | 2/1945 | Dunn | 308—187.1 |
| 2,514,097 | 7/1950 | Sharp | 170—160.23 |
| 2,534,353 | 12/1950 | Hiller et al. | 170—160.26 |
| 2,663,374 | 12/1953 | Vandermeer | 170—160.26 |
| 3,091,948 | 6/1963 | Zeller | 64—17 |
| 3,119,454 | 1/1964 | Leoni | 170—160.58 |

FOREIGN PATENTS

| | | |
|---|---|---|
| 671,693 | 2/1939 | Germany. |

SAMUEL LEVINE, *Primary Examiner.*
JULIUS E. WEST, *Examiner.*